(12) United States Patent
Tardif et al.

(10) Patent No.: US 9,151,164 B2
(45) Date of Patent: Oct. 6, 2015

(54) DUAL-USE OF COOLING AIR FOR TURBINE VANE AND METHOD

(75) Inventors: Marc Tardif, Candiac (CA); Sri Sreekanth, Mississauga (CA); Eric Durocher, Vercheres (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 747 days.

(21) Appl. No.: 13/425,816

(22) Filed: Mar. 21, 2012

(65) Prior Publication Data

US 2013/0251508 A1    Sep. 26, 2013

(51) Int. Cl.
*F01D 5/18*    (2006.01)
*F01D 9/02*    (2006.01)

(52) U.S. Cl.
CPC *F01D 5/187* (2013.01); *F01D 9/02* (2013.01); *F05D 2240/81* (2013.01); *F05D 2260/96* (2013.01); *Y10T 29/4932* (2015.01)

(58) Field of Classification Search
CPC ............ F01D 9/02; F01D 9/04; F01D 5/187; F05D 2240/81; F05D 2260/22141
USPC ............. 415/1, 115, 116; 416/1, 96 R, 97 R, 416/193 A
See application file for complete search history.

(56) References Cited

U.S. PATENT DOCUMENTS

| 3,807,892 | A | * | 4/1974 | Frei et al. ....................... 415/116 |
| 5,320,485 | A | * | 6/1994 | Bourguignon et al. ........ 415/115 |
| 5,954,475 | A | * | 9/1999 | Matsuura et al. .............. 415/115 |
| 6,969,233 | B2 | | 11/2005 | Powis et al. |
| 7,140,835 | B2 | | 11/2006 | Lee et al. |
| 8,668,440 | B2 | * | 3/2014 | Butler et al. ................... 415/116 |
| 2009/0311090 | A1 | | 12/2009 | Schilling et al. |
| 2011/0044795 | A1 | * | 2/2011 | Chon et al. ..................... 415/115 |
| 2011/0223005 | A1 | | 9/2011 | Lee et al. |

* cited by examiner

*Primary Examiner* — Edward Look
*Assistant Examiner* — Juan G Flores
(74) *Attorney, Agent, or Firm* — Norton Rose Fulbright Canada LLP

(57) ABSTRACT

A turbine vane of a gas turbine engine is provided with a hollow core in the leading edge of the outer platform thereof. The core is interconnected with the leading edge core of the airfoil whereby to create a cooling air stream having a dual purpose and cooling both the leading edge of the outer platform and of the airfoil and thereby reducing cooling air consumption. The cooling air enters the core of the outer platform through an inlet port and exits through cooling holes provided in the leading edge of the airfoil.

16 Claims, 5 Drawing Sheets

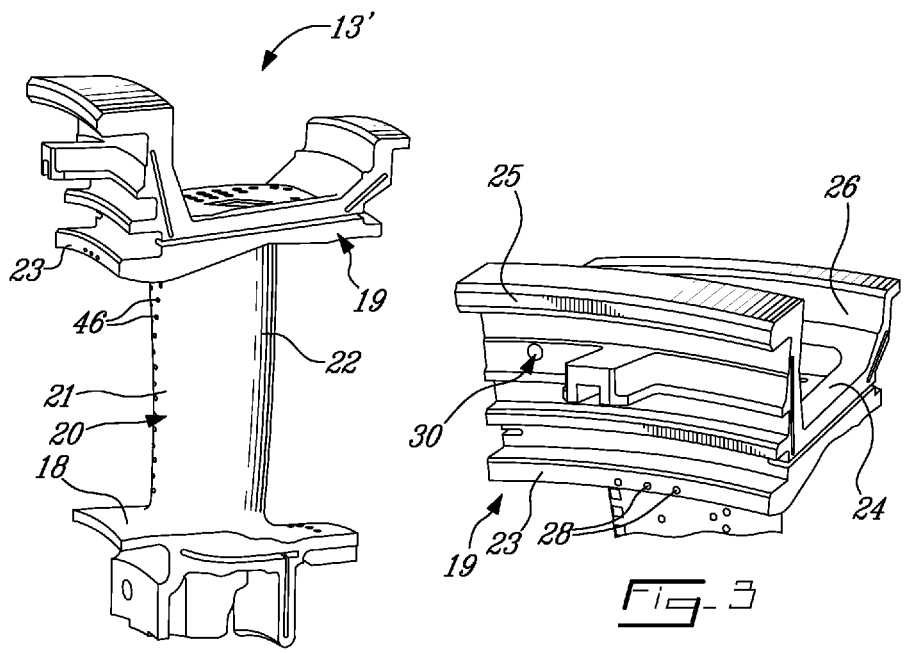
FIG-2
FIG-3
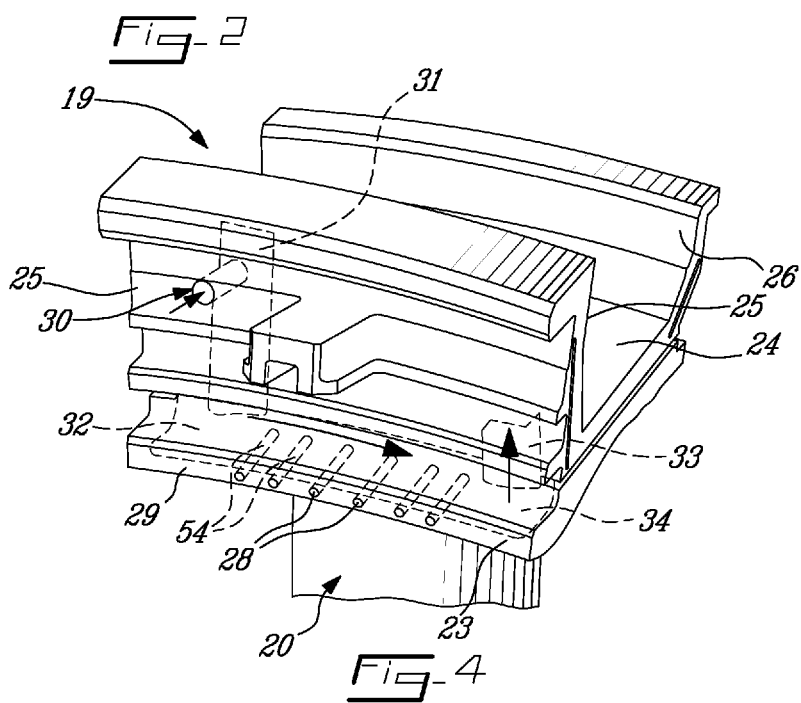
FIG-4

DUAL-USE OF COOLING AIR FOR TURBINE VANE AND METHOD

TECHNICAL FIELD

The present application relates to gas turbine engines and, more particularly, to internally cooled airfoil components for such engines.

BACKGROUND ART

High performance gas turbine engines operate at very high temperatures, requiring elaborate cooling systems to protect the exposed turbine parts, including the turbine vane airfoils and platforms. However, since flowing coolant through the turbine diminishes overall engine performance, it is typically desirable to minimize the cooling flow consumption without degrading the turbine vane durability. Heretofore, the proposed solutions still generally demand higher than required cooling consumption which therefore limits engine performance.

Accordingly, there is a need to provide a new turbine vane cooling arrangement which addresses these and other limitations of the prior art.

SUMMARY

In one aspect there is provided a turbine vane segment of a vane ring of a gas turbine engine having a gaspath, said turbine vane segment comprising at least one airfoil disposed between a radially inner and a radially outer platform, said radially outer platform having a leading edge, a hollow platform leading edge core provided in said outer platform and extending along said leading edge, an air inlet port communicating with said platform leading edge air core to admit cooling air therein for cooling the leading edge of said radially outer platform, said airfoil having a hollow airfoil leading edge core extending along a leading edge portion thereof, an interconnecting passage provided between said platform leading edge core and a radially outer end portion of said airfoil leading edge core to channel the cooling air from said platform leading edge core to said airfoil leading edge core and creating a single cooling stream for cooling both said leading edge of said outer platform and said leading edge of said airfoil.

According to another aspect, there is provided a method of forming an internally cooled turbine vane segment for a gas turbine engine, the turbine vane segment having at least one airfoil extending between a radially outer platform and a radially inner platform, the method comprising: forming a platform leading edge core in a leading edge portion of the radially outer platform of the turbine vane segment; forming an inlet port in said radially outer platform for communicating cooling air to said platform leading edge core; and forming an interconnecting passage in said radially outer platform to interconnect said platform leading edge core with an airfoil leading edge core of the at least one airfoil of the turbine vane segment, the airfoil leading edge core extending along a leading edge of the airfoil.

BRIEF DESCRIPTION OF DRAWINGS

Reference is now made to the accompanying drawings, in which:

FIG. 2 is an isometric view of a turbine vane segment including at least one airfoil extending between inner and outer platforms;

FIG. 3 is an enlarged view of the outer platform of the turbine vane segment illustrating the location of a cooling air inlet port;

FIG. 4 is an enlarged isometric view similar to FIG. 3 but illustrating the internal position and configuration of a hollow core or cavity provided in the leading edge portion of the outer platform and its communication conduits relative to the cooling air inlet port;

DETAILED DESCRIPTION

Figure 1:
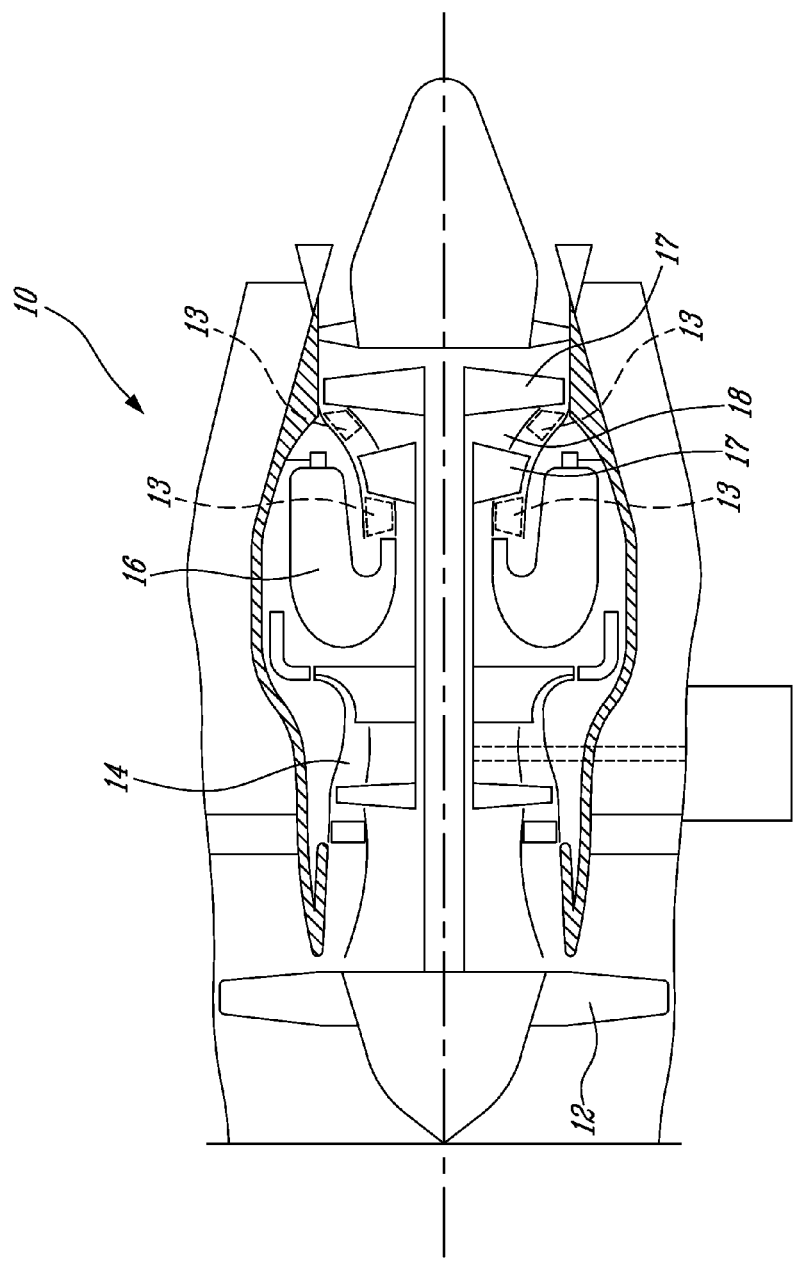
FIG. 1 is a schematic cross-sectional view of a gas turbine engine.

Referring to the drawings, FIG. 1 illustrates a gas turbine engine 10 of a type preferably provided for use in subsonic flight. The turbine engine 10 generally comprises in serial flow communication a fan 12 through which ambient air is propelled, a multi-stage compressor 14 for pressuring the air, a combustor 16 in which the compressed air is mixed with fuel and ignited for generating an annular stream of hot combustion gases. A turbine section 18 extracts energy from the combustion gases and drives the fan 12 and the compressor 14. The turbine section 18 comprises at least one stage (two in the illustrated example) including a circumferential array of stationary turbine vanes 13 and a circumferential array of rotor blades 17.

The combustor 16 operates at high temperatures and therefore the vane rings 13 are exposed to these high temperatures. For that reason, the turbine vane rings 13 are made of materials capable of withstanding these high temperatures. The vane rings are typically cast and circumferentially segmented to accommodate various thermal gradients between the turbine components. The vane rings 13 may be provided with internal cooling systems for prolonging the life thereof and reducing the likelihood of failure as a result of the excessive temperatures.

FIG. 2 illustrate a segment of a turbine vane ring 13. The turbine vane ring segment 13' may comprise a radially inner platform 18 and a radially outer platform 19 and at least one airfoil 20 extending therebetween. The platforms 18 and 19 define therebetween a section of the gaspath of the gas turbine engine 10. The airfoil 20 has a leading edge 21 and a trailing edge 22. Conventional airfoils of gas turbine engines have many different designs for internal cooling and although many of these conventional cooling systems have operated successfully, the cooling demands of turbine engines have increased. It is also desirable to cool the leading edge 23 of the outer platform 19 and this produces more demand on cooling air. It is therefore desirable to increase the cooling capabilities of the cooling system in an attempt to reduce cooling air consumption.

Figure 5:
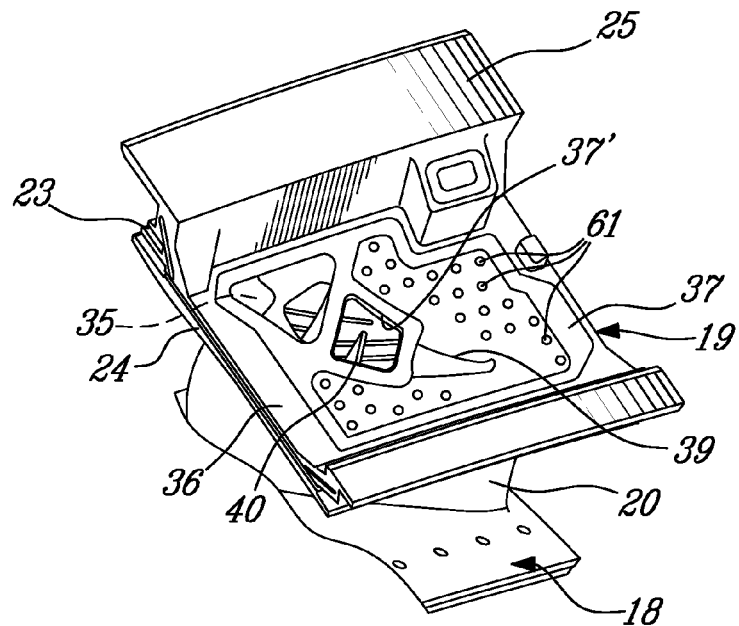
FIG. 5 is a top isometric view of the outer platform showing the location of the interconnecting cavity which interconnects the hollow core of the outer platform with a hollow core in the leading edge portion of the airfoil.
Figure 7:
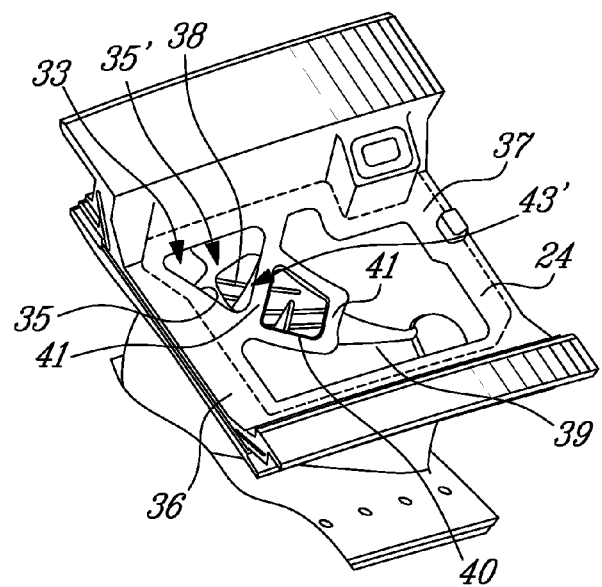
FIG. 7 is a top view, similar to FIG. 5, of the outer platform showing the cover plate having been removed.

Referring now additionally to FIGS. 3 and 4, it can be seen that the outer platform 19 typically defines a band section 24, a leading section 25 projecting radially outwardly from a forward end of the band section 24, and a trailing section 26 extending radially outwardly from a rearward end of the band section 24. The leading edge 23 of the outer platform 19 is provided at a radially inner end of the leading section 25 adjacent the radially outer end of the airfoil 20. This leading section 25 and particularly the leading edge 23 thereof is subject to high temperature by the hot gases discharged from the combustor 16. Cooling holes 28 are typically provided in the leading edge 23 to allow for the formation of a film of cooling air over the leading edge 23 of the outer platform 19. As shown in FIG. 4, the turbine vane segment 13' may also incorporate in the leading section 25 a hollow cooling core 29 extending generally longitudinally along the leading edge 23 of the outer platform 19. This cooling core 29 may be provided in the form of a longitudinal cooling chamber to receive cooling air from an inlet port 30 located in a radially outer end region of the leading section 25. The inlet port 30 is disposed in fluid flow relationship with compressor bleed air or another suitable source of cooling fluid. As shown in FIG. 4, the platform leading edge core 29 has an inlet conduit 31 extending radially inwardly from the inlet port 30 to an inlet end section 32 of the cooling core 29. The cooling core 29 further comprises an outlet conduit 33 extending from an outlet end 34. The outlet conduit 33 is connected in fluid flow communication with an interconnecting passage which may be defined by an interconnecting cavity 35, as shown in FIGS. 5 and 7, formed in a radially outer surface 36 of the band section 24 of the outer platform 19. A cover plate, as herein shown by phantom lines 37, is provided over the interconnecting cavity 35 to form an interconnecting chamber 35'.

The interconnecting chamber 35' bridges the outlet conduit 33 of the outer platform leading edge core 29 with a radially outer end of a leading edge hollow core 38 of the airfoil 20. As can be seen from FIG. 6A, the airfoil 20 may further include a trailing edge hollow core 39 and a mid-chord hollow core 40. The leading edge core 38 is fed with cooling air from the leading edge outer platform core 29 via the interconnecting chamber 35'. Accordingly, the same cooling air may be used to both cool the leading edge 23 of the outer platform 19 and the leading edge 21 of the airfoil 20. The mid-chord and the trailing edge cores 40 and 39 are separately fed from a different source of cooling air. As shown in FIG. 5, the core 39 is cooled by air passing through impingement holes 61 defined in the cover plate 37. The mid-chord hollow core 40 is fed directly through the opening 37' formed in the cover 37. The cooling air flows through the cores 39 and 40 may be independent from each other and air introduced therein from the outer end exits through holes formed in the airfoil walls. As shown in FIG. 4, the small holes 28 formed in the leading edge 32 are exit holes communicating with the cooling core 29 whereby a small amount of air flowing through the cooling core 29 is used to provide additional cooling of the leading edge 23.

The leading edge, mid-chord and trailing edge cores of the airfoil 20 are separated by radially extending partition or division walls 41 and several of these division walls may be provided. Some of the division walls may have crossover flow passages defined therein. These division walls 41 may be in the form of transverse ribs formed between the opposed suction and pressure walls 42 and 42' of the airfoil 20.

Figure 6A:
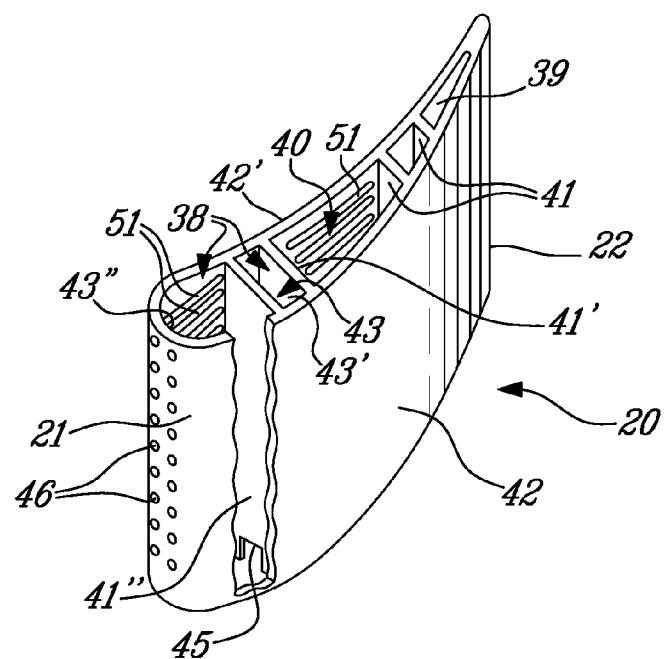
FIG. 6A is a fragmented section view of a typical airfoil of a turbine vane illustrating the structure of a hollow core wherein a leading edge core is isolated from a trailing edge core.

Referring to FIGS. 6A to 8, it can be appreciated that the airfoil leading edge core 38 defines a first passage 43' which is disposed to receive cooling air from the interconnecting chamber 35'. The first passage 43' extends radially from the outer platform 19 to the inner platform 18. The first passage 43' is formed between division walls 41' and 41" (see FIGS. 6A and 8). Division wall 41' isolates the leading edge hollow core 38 from the mid-chord core 40 and is accordingly a solid wall extending the length of the airfoil 20. The division wall 41" is provided with an opening or passage 45 at the radially inner end thereof whereby cooling air entering the first passage 43' from the radially outer end of the leading edge core 38 of the airfoil 20 will descend into the passage 43' (see arrow 52 in FIG. 8) and exit through the passage 45 to enter an adjacent radially extending leading edge passage 43" (FIG. 6a). The leading edge 21 of the airfoil 20 may also be provided with film-cooling holes 46, disposed at strategic locations, to permit air circulating through the channels 43' and 43" to exit the airfoil leading edge section and form a film of cooling air over the leading edge 21 (see arrows in FIG. 8). Thus a continuous cooling airflow is created from the inlet port 30 of the outer platform 19 through the platform leading edge core 29 and into the airfoil leading edge core 38 and out through holes 46 which communicate with the passage 43" of the airfoil leading edge core 38. Therefore, a single cooling airstream is provided for cooling both the leading edge 23 of the outer platform 19 and the leading edge 21 of the airfoil 20, thereby reducing cooling air consumption and improving engine performance.

Figure 6B:
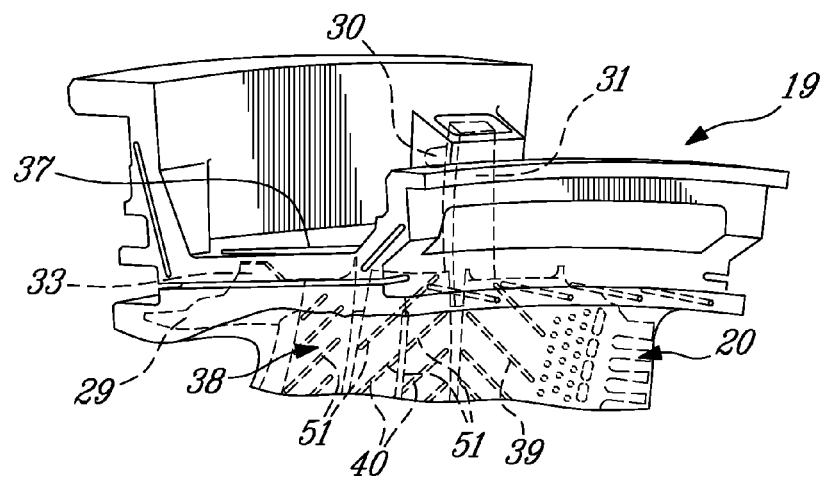
FIG. 6B is a further isometric view illustrating the formation of turbulating ribs formed in the leading edge hollow core of the airfoil.
Figure 8:
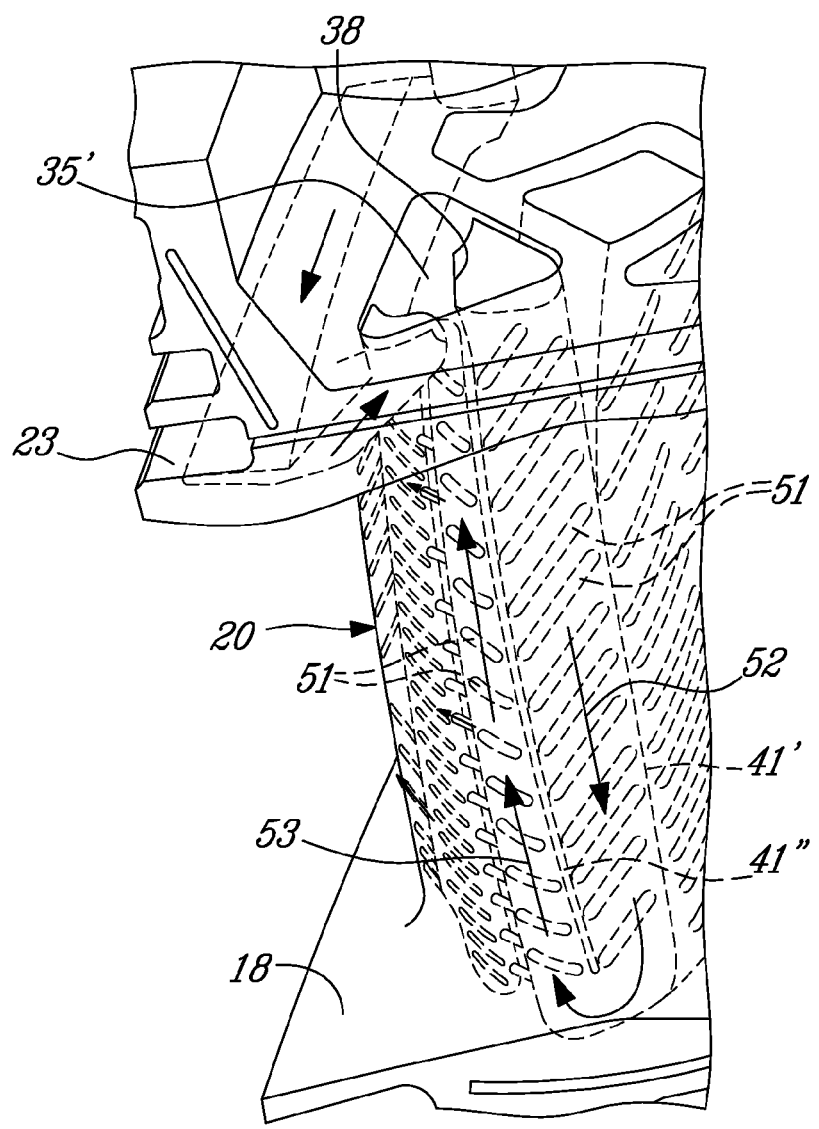
FIG. 8 is a fragmented view showing the disposition of turbulating ribs formed in the wall surfaces of the hollow core of the airfoil as well as illustrating the airflow path through the channels formed by transverse ribs disposed in the hollow core of the leading edge portion of the airfoil.

FIGS. 6B and 8 show a section view of the airfoil and as can be seen, a plurality of air turbulating ribs 51 are formed in an inner surface of the airfoil walls 42 and 42' whereby to create airflow disturbances in the downward and upward airflow paths identified by arrows 52 and 53 (FIG. 8), respectively, passing through the adjacent chambers or passages 43' and 43". These air turbulating ribs 51 may also be formed in the mid-chord hollow core 40 and trailing edge hollow core 39. Turbulator ribs may also be provided in the platform leading edge core 29 and these are illustrated by phantom lines 54 in FIG. 4. These turbulator ribs 54 perform the same function, of creating turbulence in the airflow thereby improving cooling of the leading edge 23 of the outer platform 19. The turbulator ribs 54 are known in the art as trip strips.

Summarizing the method, there is provided a cooling airstream having a double purpose to cool both the leading edge of the outer platform and of the airfoil. The method comprises the steps of forming a leading edge portion of an outer platform of a turbine vane of a gas turbine engine with a hollow cooling air core. An inlet port is formed in the outer platform for communicating cooling air to the hollow cooling air core. An interconnecting passage is formed in the outer platform to interconnect the hollow cooling air core with a hollow leading edge core of the airfoil of the turbine vane. The hollow core of the airfoil is the leading edge core segment disposed behind the leading edge of the airfoil. The leading edge of the airfoil may have holes defined therein and extending to the hollow leading edge core segment of the airfoil to discharge the cooling air from the airfoil back into the gaspath of the engine.

The hollow cooling air core in the leading edge of the outer platform is formed with a cooling chamber or passage which is disposed behind the leading edge portion of the outer platform and has an inlet conduit formed at an inlet end thereof which is in communication with the inlet port. The outlet end of the leading edge cooling air chamber has an outlet conduit leading to an interconnecting cavity formed in the top wall of the band segment of the outer platform and that cavity communicates with the leading edge hollow core 38 of the airfoil and is covered with a cover plate which may comprise impingement hole to provide for impingement cooling of the outer platform.

As previously described, the air entering the leading edge hollow core 38 of the airfoil is channeled radially inwardly in a chamber to the bottom thereof and then radially upwardly through an adjacent chamber and out of the airfoil through the air holes provided therein at strategic locations. Accordingly, there is provided a single airflow to cool both the leading edge of the outer platform and the leading edge of the airfoil thereby reducing cooling air consumption and improving engine performance.

The above description is meant to be exemplary only, and one skilled in the art will recognize that changes may be made to the embodiment described therein without departing from the scope of the appended claims. Therefore obvious modifications are intended to be covered provided that these modifications fall within the scope of the appended claims.

What is claimed is:

1. A turbine vane segment of a vane ring of a gas turbine engine having a gaspath, said turbine vane segment comprising an airfoil disposed between a radially inner and a radially outer platform, said radially outer platform having a leading edge, a hollow platform leading edge core provided in said outer platform and extending along said leading edge, an air inlet port communicating with said platform leading edge air core to admit cooling air therein for cooling the leading edge of said radially outer platform, said airfoil having a hollow airfoil leading edge core extending along a leading edge portion thereof, an interconnecting passage provided between said platform leading edge core and a radially outer end portion of said airfoil leading edge core to channel the cooling air from said platform leading edge core to said airfoil leading edge core and creating a single cooling stream for cooling both said leading edge of said outer platform and said leading edge of said airfoil, wherein said radially outer platform has a band section disposed between a leading section and a trailing section; said leading edge of said outer platform being defined in a radially inner portion of said leading section, said air inlet port being located radially outwardly relative to said radially inner portion of said leading section and in communication with a cooling air stream; said platform leading edge core defining a leading edge cooling chamber disposed in said radially inner portion behind said leading edge of said radially outer platform, an inlet conduit in flow communication between said inlet port and an inlet end of said leading edge cooling chamber, and an outlet conduit at an outlet end of said leading edge cooling chamber in flow communication with said interconnecting passage.

2. A turbine vane as claimed in claim 1 wherein said airfoil is a hollow airfoil having suction and pressure walls and a plurality of transverse ribs extending radially between said suction and pressure walls, airfoil chambers defined between said transverse ribs, some of said transverse ribs isolating a leading edge segment of said airfoil from a trailing edge segment thereof, one of said transverse ribs in said leading edge segment of said airfoil having a communication passage permitting flow communication between adjacent ones of said chambers to define a cooling airflow path in said chambers thereof.

3. A turbine vane as claimed in claim 2 wherein said communication passage is located adjacent a radially inner end of said airfoil to connect with an adjacent one of said airfoil chambers from a radially inner end thereof to thereby create a first radial flow path in one of said chambers communicating with said connecting chamber, at a radially outer end of said airfoil, to a radially inner end of said one of said chambers and a second radial flow path in said adjacent one of said airfoil chambers.

4. A turbine vane as claimed in claim 3 wherein there is further provided a plurality of turbulator ribs formed in an inner surface of at least some of said airfoil chambers defined between said transverse ribs in said leading edge section of said airfoil to create airflow turbulences in said first and second radial flow paths.

5. A turbine vane as claimed in claim 1 wherein said outer platform leading edge cooling chamber is further provided with a plurality of turbulator ribs formed in an inner surface thereof to create flow turbulences in said outer platform leading edge cooling chamber.

6. A turbine vane as claimed in claim 1 wherein said interconnecting passage is an interconnecting cavity formed in a radially outer wall of said band section of said outer platform, and a cover plate secured over said interconnecting cavity to form an interconnecting chamber.

7. A method of forming an internally cooled turbine vane segment for a gas turbine engine, the turbine vane segment having at least one airfoil extending between a radially outer platform and a radially inner platform, the method comprising:
   i) forming a platform leading edge core in a leading edge portion of the radially outer platform of the turbine vane segment, including forming said platform leading edge core to define a leading edge cooling chamber disposed behind said leading edge of said radially outer platform, and forming an inlet conduit in flow communication between said inlet port and an inlet end of said leading edge cooling chamber;
   ii) forming an inlet port in said radially outer platform for communicating cooling air to said platform leading edge core; and
   iii) forming an interconnecting passage in said radially outer platform to interconnect said platform leading edge core with an airfoil leading edge core of the at least one airfoil of the turbine vane segment, the airfoil leading edge core extending along a leading edge of the at least one airfoil.

8. A method as claimed in claim 7 wherein step (i) further comprises: forming said interconnecting passage by forming an interconnecting cavity in a radially outer wall of a band section of said radially outer platform and forming an outlet conduit from an outlet end of said outer platform leading edge cooling chamber to said interconnecting cavity.

9. A method as claimed in claim 8 further comprising: securing a cover plate over said interconnecting cavity to form an interconnecting chamber.

10. A method as claimed in claim 8 wherein said airfoil is a hollow airfoil having opposed pressure and suction walls, and a plurality of ribs extending radially between the pressure and suction walls, airfoil chambers defined between said transverse ribs, some of said transverse ribs isolating a leading edge segment of said airfoil from a trailing segment thereof, one of said transverse ribs in said leading edge segment of said airfoil having a communication passages permitting flow communication between adjacent ones of said chambers to define a cooling flow path in said chambers.

11. A method as claimed in claim 10 wherein forming a communication passage comprises: forming a communication passage adjacent a radially inner end of said one of said transverse ribs to thereby create a first radial flow path from said interconnecting cavity to a radially inner end of said one of said airfoil chambers and a second radial flow path in said adjacent one of said airfoil chambers, said adjacent one of said airfoil chambers being located behind said leading edge of said airfoil.

12. A method as claimed in claim 10 further comprising: forming a plurality of turbulator ribs in an inner surface of at least some of said airfoil chambers defined between said transverse ribs in said leading edge segment of said airfoil to create flow disturbances.

13. A method as claimed in claim 7 further comprising: forming a plurality of turbulator ribs in an inner surface of said platform leading edge core of said outer platform to create flow disturbances.

14. A turbine vane segment of a gas turbine engine comprising: an airfoil extending between a radially inner and a radially outer platform, said radially outer platform having a leading edge and a leading edge cooling chamber disposed behind said leading edge, turbulator ribs disposed in said leading edge cooling chamber, a hollow leading edge core extending along a leading edge portion of the airfoil, an interconnecting passage defined in the radially outer platform and interconnecting the hollow leading edge core of the airfoil in fluid flow communication with the leading edge cooling chamber of the radially outer platform, and a first set of cooling holes distributed along the leading edge portion of the airfoil, the first set of cooling holes being in fluid flow communication with the hollow leading edge core of the airfoil, wherein an outlet conduit extends from an outlet end of the leading edge cooling chamber to the interconnecting passage.

15. The turbine vane segment as defined in claim 14, wherein a second set of cooling holes is provided along the leading edge of the radially outer platform.

16. The turbine vane segment as defined in claim 14, wherein an inlet port is defined in the radially outer platform, and wherein an inlet conduit connects said leading edge cooling chamber in fluid flow communication with said inlet port.

* * * * *